United States Patent
Moriya et al.

(10) Patent No.: US 11,161,420 B2
(45) Date of Patent: Nov. 2, 2021

(54) VEHICLE POWER SUPPLY APPARATUS

(71) Applicant: SUBARU CORPORATION, Tokyo (JP)

(72) Inventors: Fumiyuki Moriya, Tokyo (JP); Hirofumi Yabe, Tokyo (JP); Yusuke Komatsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 48 days.

(21) Appl. No.: 16/837,269

(22) Filed: Apr. 1, 2020

(65) Prior Publication Data

US 2021/0008986 A1 Jan. 14, 2021

(30) Foreign Application Priority Data

Jul. 11, 2019 (JP) .............................. JP2019-128881

(51) Int. Cl.
*B60L 50/60* (2019.01)
*H01M 10/44* (2006.01)

(52) U.S. Cl.
CPC ............. *B60L 50/66* (2019.02); *H01M 10/44* (2013.01); *B60L 2240/547* (2013.01); *H01M 2220/20* (2013.01)

(58) Field of Classification Search
CPC ................................ B60L 50/66; H01M 10/44
See application file for complete search history.

(56) References Cited

U.S. PATENT DOCUMENTS

| | | | |
|---|---|---|---|
| 6,215,281 B1 * | 4/2001 | Koch | H02J 7/007194 320/150 |
| 7,755,329 B2 * | 7/2010 | Kohn | H02J 7/007194 320/150 |
| 8,725,330 B2 * | 5/2014 | Failing | B60L 53/124 701/22 |
| 9,114,794 B2 * | 8/2015 | King | B60L 58/12 |
| 9,299,093 B2 * | 3/2016 | Kidston | B60L 3/003 |
| 9,676,283 B2 * | 6/2017 | Jackson | B60L 58/26 |
| 10,882,413 B2 * | 1/2021 | Ferran | H01M 10/613 |

(Continued)

FOREIGN PATENT DOCUMENTS

| | | |
|---|---|---|
| JP | 2008-180207 A | 8/2008 |
| JP | 2016-153260 A | 8/2016 |

*Primary Examiner* — James A Shriver, II
*Assistant Examiner* — James J Triggs
(74) *Attorney, Agent, or Firm* — McGinn IP Law Group, PLLC

(57) ABSTRACT

A vehicle power supply apparatus includes first and second power supply devices, an electrical conduction path, an accumulator, an electric device, and a power supply controller. In switching to a state with electric power supplied from the second power supply device to the electric device, the power supply controller determines whether a discharge state of the accumulator is normal, with a target voltage of the second power supply device lower than an inferior voltage, and with a target voltage of the first power supply device between the inferior voltage and a superior voltage. After determining that the discharge state of the accumulator is normal, the power supply controller allows the target voltage of the first power supply device to be lower than the inferior voltage, and allows the target voltage of the second power supply device to be higher than the superior voltage.

14 Claims, 8 Drawing Sheets

(56) References Cited

U.S. PATENT DOCUMENTS

| | | | |
|---|---|---|---|
| 10,903,534 B2* | 1/2021 | Singer | H01M 10/65 |
| 11,043,834 B2* | 6/2021 | Manzoor | H01M 10/425 |
| 2013/0127417 A1* | 5/2013 | Karner | B60L 53/63 |
| | | | 320/109 |
| 2014/0012447 A1* | 1/2014 | Gao | B60L 53/11 |
| | | | 701/22 |
| 2016/0129797 A1* | 5/2016 | Jackson | B60L 53/14 |
| | | | 320/109 |

* cited by examiner

VEHICLE POWER SUPPLY APPARATUS

CROSS-REFERENCE TO RELATED APPLICATIONS

This application claims priority from Japanese Patent Application No. 2019-128881 filed on Jul. 11, 2019, the entire contents of which are hereby incorporated by reference.

BACKGROUND

The technology relates to a vehicle power supply apparatus to be mounted on a vehicle.

For a power supply apparatus to be mounted on a vehicle, proposals have been made to provide such a vehicle power supply apparatus with a plurality of power supply devices. For example, reference can be made to Japanese Unexamined Patent Application Publication (JP-A) Nos. 2008-180207 and 2016-153260. Examples of the power supply devices to be installed in the vehicle power supply apparatus include an alternator to be driven by an engine, and a converter that steps down electric power from a high-voltage battery and outputs stepped-down electric power. The vehicle power supply apparatus further includes electric devices such as controllers and actuators, and accumulators such as a lead battery and a lithium ion battery.

SUMMARY

An aspect of the technology provides a vehicle power supply apparatus to be mounted on a vehicle. The vehicle power supply apparatus includes a first power supply device, a second power supply device, an electrical conduction path, an accumulator, an electric device, and a power supply controller. The first power supply device includes a first terminal. The second power supply device includes a second terminal. The electrical conduction path is coupled between the first terminal and the second terminal. The accumulator is coupled to the electrical conduction path. The electric device is coupled to the electrical conduction path. The power supply controller is configured to control a target voltage of the first power supply device and a target voltage of the second power supply device, to supply electric power from the first power supply device or the second power supply device to the electric device. In switching from a state with electric power supplied from the first power supply device to the electric device, to a state with electric power supplied from the second power supply device to the electric device, the power supply controller determines whether a discharge state of the accumulator is normal, with the target voltage of the second power supply device controlled to be lower than an inferior voltage, and with the target voltage of the first power supply device controlled to be between the inferior voltage and a superior voltage. The superior voltage is higher than the inferior voltage. After determining that the discharge state of the accumulator is normal, the power supply controller allows the target voltage of the first power supply device to be lower than the inferior voltage, and allows the target voltage of the second power supply device to be higher than the superior voltage.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
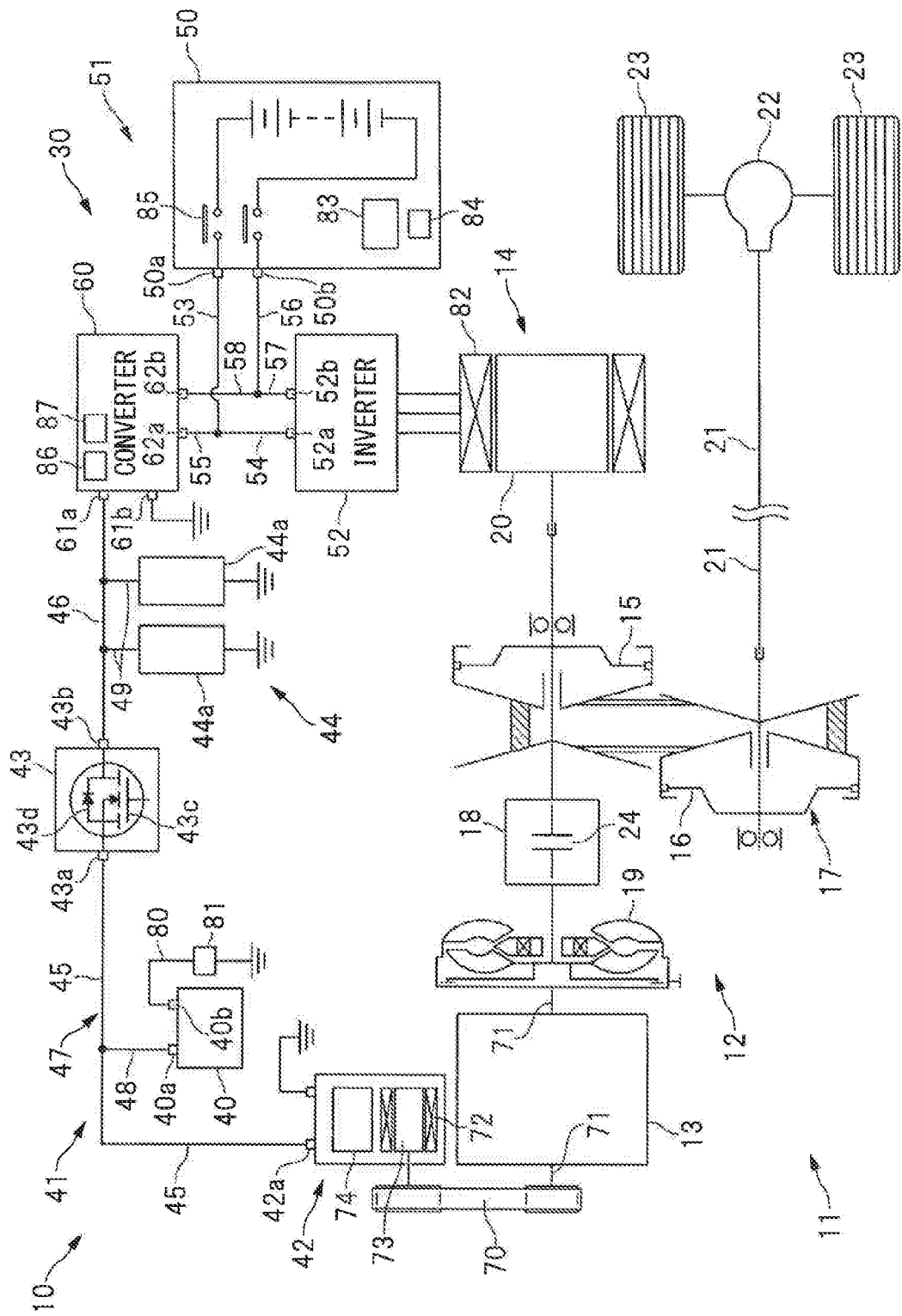
FIG. 1 is a schematic diagram of a configuration example of a vehicle on which a vehicle power supply apparatus according to one embodiment of the technology is mounted.

Some vehicle power supply apparatuses are provided with a plurality of power supply devices, but their simultaneous operation may cause possibility that a voltage control of one of the power supply devices interferes with a voltage control of another, contributing to fluctuation in output voltages. Accordingly, such a vehicle power supply apparatus often assigns any one of the plurality of the power supply devices to power supply operation, on the basis of factors such as a vehicle state. Moreover, the vehicle power supply apparatus transfers the assignment of the power supply operation from one of the power supply devices to another, on which occasion the vehicle power supply apparatus stops whichever power supply device is in operation, and thereafter, brings another into operation, in terms of avoidance of the simultaneous operation of the plurality of the power supply devices. However, if an accumulator provided in the vehicle power supply apparatus should have abnormality such as a lowered state of charge (SOC), there would be possibility of shortage of electric power to be supplied to electric devices such as controllers and actuators, when all the power supply devices are temporarily stopped in the course of the transfer of the assignment of the power supply operation from one of the power supply devices to another.

It is desirable to provide a vehicle power supply apparatus that makes it possible to transfer assignment of electric power supply from one of power supply devices to another, without causing shortage of electric power to be supplied to an electric device.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

[Vehicle Configuration]

FIG. 1 schematically illustrates a configuration example of a vehicle 11 on which a vehicle power supply apparatus 10 according to one embodiment of the technology is mounted. Referring to FIG. 1, on the vehicle 11, a power train 12 may be mounted. The power train 12 may include, as power sources, an engine 13 and a motor generator 14. Moreover, the power train 12 may be provided with a continuous variable transmission 17 including a primary pulley 15 and a secondary pulley 16. The engine 13 may be coupled to one side of the primary pulley 15 through a forward and reverse switching mechanism 18 and a torque converter 19. A rotor 20 of the motor generator 14 may be coupled to the other side of the primary pulley 15. Wheels 23 may be coupled to the secondary pulley 16 through, for example, a wheel output shaft 21 and a differential mechanism 22. It is to be noted that the forward and reverse switching mechanism 18 may include, for example, a forward clutch 24, a reverse brake, and a planetary gear train.

The vehicle 11 as illustrated may have, as traveling modes, an engine traveling mode and a motor traveling mode. The engine traveling mode includes driving the engine 13. The motor traveling mode includes stopping the engine 13. In executing the engine traveling mode, the forward clutch 24 of the forward and reverse switching mechanism 18 may be engaged, to couple the engine 13 to the wheels 23. This makes it possible to drive the wheels 23 with engine power. In executing the motor traveling mode, the forward clutch 24 of the forward and reverse switching mechanism 18 may be disengaged, to isolate the engine 13 from the wheels 23. This makes it possible to drive the motor generator 14, with the engine 13 stopped, and to drive the wheels 23 with motor power. These traveling modes may be decided on the basis of requested driving power on vehicle travel and/or a state of charge (SOC) of a high-voltage battery 50 described below. For example, in a case where the SOC of the high-voltage battery 50 is higher than a predetermined value and an amount of stepping down of an accelerator pedal is small, with the requested driving power being small, the motor traveling mode may be selected as the traveling mode. Meanwhile, in a case where the SOC of the high-voltage battery 50 is lower than a predetermined value, or in a case where the amount of the stepping down of the accelerator pedal is great, with the requested driving power being great, the engine traveling mode may be selected as the traveling mode.

[Power Circuit]

Figure 2:
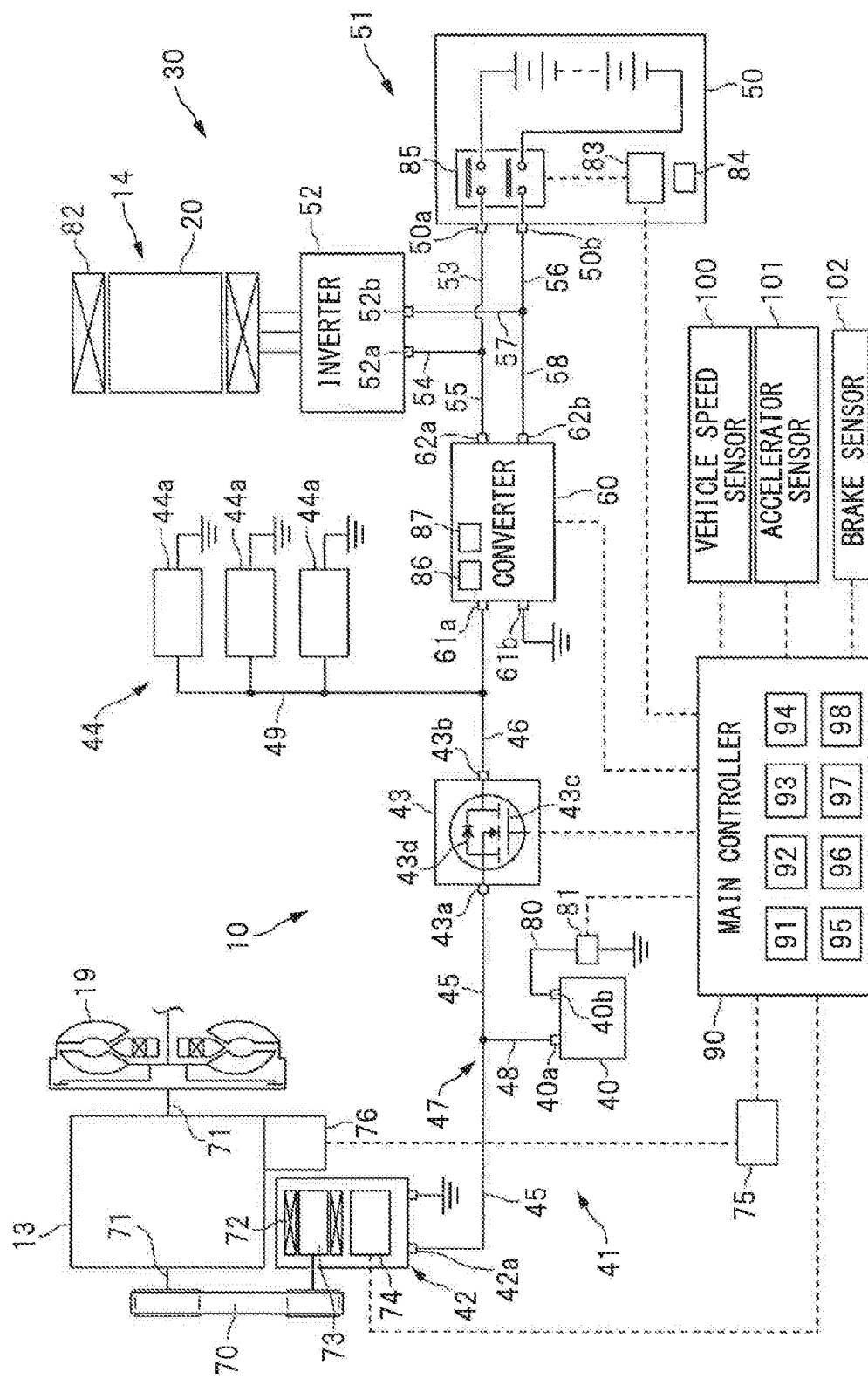
FIG. 2 is a circuit diagram of a simplified example of a power circuit and a control system.

The vehicle power supply apparatus 10 may include a power circuit 30, description of which is given below. FIG. 2 is a circuit diagram of a simplified example of the power circuit 30 and a control system. Referring to FIGS. 1 and 2, the power circuit 30 may include a low-voltage system 41 and a high-voltage system 51. The low-voltage system 41 may include a low-voltage battery 40. The high-voltage system 51 may include a high-voltage battery 50 having a higher voltage than the low-voltage battery 40. The low-voltage system 41 may include, for example but not limited to, the low-voltage battery 40, a starter generator 42, a semiconductor relay 43, and a group of electric devices 44.

The high-voltage system 51 may include, for example but not limited to, the high-voltage battery 50, an inverter 52, and the motor generator 14. Moreover, a converter 60 may be provided between the low-voltage system 41 and the high-voltage system 51. The converter 60 may supply electric power from the high-voltage system 51 to the low-voltage system 41. The converter 60 may include a positive electrode terminal 61a and a negative electrode terminal 61b. The positive electrode terminal 61a may be coupled to the low-voltage system 41. The converter 60 may further include a positive electrode terminal 62a and a negative electrode terminal 62b. The positive electrode terminal 62a and the negative electrode terminal 62b may be coupled to the high-voltage system 51.

In one embodiment of the technology, the low-voltage battery 40 may serve as an "accumulator". In one embodiment of the technology, the high-voltage battery 50 may serve as an "additional accumulator".

Described is a coupling structure of the low-voltage system 41. A positive electrode terminal 42a of the starter generator 42 and the positive electrode terminal 61a of the converter 60 may be coupled to each other through an electrical conduction path 47. The electrical conduction path 47 may include a positive electrode line 45, the semiconductor relay 43, and a positive electrode line 46. The positive electrode line 45 may be coupled between the starter generator 42 and the semiconductor relay 43. To the positive electrode line 45, coupled may be a positive electrode terminal 40a of the low-voltage battery 40 through a positive electrode line 48. The positive electrode line 46 may be coupled between the semiconductor relay 43 and the converter 60. To the positive electrode line 46, coupled may be the group of the electric devices 44 through a positive electrode line 49. The group of the electric devices 44 may include a plurality of electric devices 44a. In this way, the starter generator 42 and the converter 60 may be coupled to each other through the electrical conduction path 47. To the electrical conduction path 47, coupled may be the low-voltage battery 40 and the electric devices 44a. It is to be noted that the electric devices 44a may include various controllers and various actuators. Non-limiting examples of the electric devices 44a may include a side slip prevention device, an electric power steering device, and an audio device.

In one embodiment of the technology, the starter generator 42 may serve as a "first power supply device", and a "generator". In one embodiment of the technology, the positive electrode terminal 42a of the starter generator 42 may serve as a "first terminal". In one embodiment of the technology, the converter 60 may serve as a "second power supply device". In one embodiment of the technology, the positive electrode terminal 61a of the converter 60 may serve as a "second terminal".

Described next is a coupling structure of the high-voltage system 51. To a positive electrode terminal 50a of the high-voltage battery 50, coupled may be a positive electrode line 53. To a positive electrode terminal 52a of the inverter 52, coupled may be a positive electrode line 54. To the positive electrode terminal 62a of the converter 60, coupled may be a positive electrode line 55. These positive electrode lines 53 to 55 may be coupled to one another. Moreover, to a negative electrode terminal 50b of the high-voltage battery 50, coupled may be a negative electrode line 56. To a negative electrode terminal 52b of the inverter 52, coupled may be a negative electrode line 57. To the negative electrode terminal 62b of the converter 60, coupled may be a negative electrode line 58. These negative electrode lines 56 to 58 may be coupled to one another.

[Low-Voltage System]

Described below are components that constitute the low-voltage system 41. The low-voltage system 41 may include the starter generator 42. The starter generator 42 may be coupled to a crankshaft 71 of the engine 13 through a belt mechanism 70. The starter generator 42 may include a so-called integrated starter generator (ISG) that serves as a generator and an electric motor. The starter generator 42 may serve not only as a generator that performs power generation with the use of engine power, but also as an electric motor that causes starting rotation of the crankshaft 71. Moreover, the starter generator 42 may include a stator 72 and a rotor 73. The stator 72 may include a stator coil. The rotor 73 may include a field coil. Furthermore, in order to control energized states of the stator coil and the field coil, the starter generator 42 may further include an ISG controller 74. The ISG controller 74 may include, for example but not limited to, an inverter, a regulator, a microcomputer, and various sensors.

Allowing the ISG controller 74 to control the energized states of the field coil and the stator coil makes it possible to control, for example but not limited to, a power generation voltage, power generation torque, and powering torque of the starter generator 42. In other words, the starter generator 42 may be operable in a power generation state, a stopped state, and a powering state. The power generation state includes performing the power generation by engine rotation. The stopped state includes stopping the power generation by the engine rotation. The powering state includes causing the starting rotation, i.e., cranking, of the engine 13. Moreover, the ISG controller 74 may detect a power generation voltage Visg and a power generation current Iisg of the starter generator 42. It is to be noted that the power generation current Iisg of the starter generator 42 may be estimated from, for example, excitation currents of the stator coil and the field coil, or alternatively, the power generation current Iisg of the starter generator 42 may be detected using a current sensor.

As mentioned above, to the crankshaft 71 of the engine 13, coupled may be the starter generator 42 that also serves as the electric motor. The starter generator 42 may be used to cause the cranking of the engine 13, at the restart of the engine 13 in accompaniment with a change from the motor traveling mode to the engine traveling mode that are described above, or at the restart of the engine 13 in accompaniment with an idling stop control described below. It is to be noted that the vehicle 11 may include an engine controller 75. The engine controller 75 may include an electronic control unit including, for example but not limited to, a microcomputer. Moreover, at a start-up of the engine 13 by the starter generator 42, auxiliaries 76 may be controlled by the engine controller 75. Non-limiting examples of the auxiliaries 76 may include an injector and an ignition module.

The semiconductor relay 43 may be provided between the starter generator 42 and the converter 60. The semiconductor relay 43 may include an opening and closing part 43c and a diode part 43d. The opening and closing part 43c may include, for example but not limited to, a metal oxide semiconductor field effect transistor (MOSFET). Controlling the semiconductor relay 43 to an ON state causes the opening and closing part 43c to be an electrically conductive state, permitting bidirectional electrical conduction between terminals 43a and 43b. In other words, controlling the semiconductor relay 43 to the ON state permits both a current flowing from the starter generator 42 toward the converter 60 and a current flowing from the converter 60 toward the starter generator 42. Moreover, the semiconductor relay 43 may include the diode part 43d that permits electrical conduction from the terminal 43a to the terminal 43b. Thus, controlling the semiconductor relay 43 to an OFF state permits solely unidirectional electrical conduction between the terminals 43a and 43b. In other words, controlling the semiconductor relay 43 to the OFF state causes the opening and closing part 43c to be controlled to a cut-off state. This renders cut off the current flowing from the converter 60 toward the starter generator 42, while permitting the current flowing from the starter generator 42 toward the converter 60.

To a negative electrode terminal 40b of the low-voltage battery 40, coupled may be a negative electrode line 80. On the negative electrode line 80, provided may be a battery sensor 81 that detects, for example but not limited to, a terminal voltage of the low-voltage battery 40. Using the battery sensor 81 makes it possible to detect the terminal voltage of the low-voltage battery 40. Hereinbelow, the terminal voltage of the low-voltage battery 40 is also referred to as a battery voltage VPb. The battery voltage VPb indicates an applied voltage to the electrical conduction path 47 coupled between the starter generator 42 and the converter 60. In addition to the detection of the terminal voltage of the low-voltage battery 40, the battery sensor 81 may also detect a charge current and a discharge current of the low-voltage battery 40, and detect a state of charge (SOC) of the low-voltage battery 40. It is to be noted that the SOC of the low-voltage battery 40 refers to a ratio that indicates an amount of remaining electrical energy of the low-voltage battery 40, or a ratio of an amount of accumulated electric energy to a full charged capacity of the low-voltage battery 40. For example, in a case where the low-voltage battery 40 is charged to an upper limit capacity, the SOC may be calculated as 100%. For example, in a case where the low-voltage battery 40 discharges to a lower limit capacity, the SOC may be calculated as 0%. Moreover, the battery sensor 81 may be also coupled to the positive electrode terminal 40a of the low-voltage battery 40 through an undepicted electrical conduction line.

[High-Voltage System]

Described below are components that constitute the high-voltage system 51. The high-voltage system 51 may include the inverter 52. To the inverter 52, coupled may be a stator 82 of the motor generator 14. The inverter 52 may include, for example but not limited to, a switching device and a capacitor, and perform conversion between direct current (DC) power and alternating current (AC) power. In controlling the motor generator 14 to the powering state, the inverter 52 may convert DC power to AC power, causing electric power supply from the high-voltage battery 50 to the motor generator 14. In controlling the motor generator 14 to a regenerative state, the inverter may convert AC power to DC power, causing electric power supply from the motor generator 14 to the high-voltage battery 50.

The high-voltage battery 50 may further include a battery controller 83. The battery controller 83 may include an electronic control unit including, for example but not limited to, a microcomputer. The high-voltage battery 50 may further include a battery sensor 84. The battery sensor 84 may detect, for example but not limited to, a charge current, a discharge current, a terminal voltage, and a temperature. The battery controller 83 provided in the high-voltage battery 50 may calculate the state of charge (SOC) of the high-voltage battery 50 on the basis of, for example but not limited to, the charge current and the discharge current transmitted from the battery sensor 84. It is to be noted that the SOC of the high-voltage battery 50 refers to a ratio that indicates an amount of remaining electrical energy of the high-voltage battery 50, or a ratio of an amount of accumulated electric energy to a full charged capacity of the high-voltage battery 50. For example, in a case where the high-voltage battery 50 is charged to an upper limit capacity, the SOC may be calculated as 100%. For example, in a case where the high-voltage battery 50 discharges to a lower limit capacity, the SOC may be calculated as 0%. Moreover, the high-voltage battery 50 may include a main relay 85. The main relay 85 may be provided for isolation of a battery cell from the power circuit 30.

[Converter]

As mentioned above, the converter 60 may be provided between the low-voltage system 41 and the high-voltage system 51. The converter 60 may include, for example but not limited to, a switching device and a capacitor. The converter 60 may step down DC power of the high-voltage battery 50 and output stepped-down electric power to, for example but not limited to, the group of the electric devices 44. The converter 60 may be operable in a discharge state and a stopped state. The discharge state includes discharging toward, without limitation, the group of the electric devices 44. The stopped state includes stopping the discharge toward, without limitation, the group of the electric devices 44. Moreover, the converter 60 may include a voltage sensor 86 and a current sensor 87. The voltage sensor 86 may detect a discharge voltage Vcon of the positive electrode terminal 61*a*. The current sensor 87 may detect a discharge current from the positive electrode terminal 61*a*. It is to be noted that the converter 60 is also called a DCDC converter.

[Control System]

As illustrated in FIG. 2, the vehicle power supply apparatus 10 may include a main controller 90. The main controller 90 is provided for a cooperative control of, for example but not limited to, the power train 12 and the power circuit 30. The main controller 90 may include an electronic control unit including, for example but not limited to, a microcomputer. The main controller 90 may include an engine control unit 91, an ISG control unit 92, a relay control unit 93, a converter control unit 94, and an inverter control unit 95. The engine control unit 91 may control the engine 13. The ISG control unit 92 may control the starter generator 42. The relay control unit 93 may control the semiconductor relay 43. The converter control unit 94 may control the converter 60. The inverter control unit 95 may control the inverter 52. The main controller 90 may further include a traveling mode control unit 96, an idling stop control unit 97, and a battery determination unit 98. The traveling mode control unit 96 may control switching of the traveling modes. The idling stop control unit 97 may execute the idling stop control. The battery determination unit 98 may determine a discharge state of the low-voltage battery 40.

In one embodiment of the technology, as described below, the ISG control unit 92, the converter control unit 94, and the battery determination unit 98 that constitute the main controller 90 may serve as a "power supply controller" configured to switch power supply modes.

The main controller 90, the ISG controller 74, the engine controller 75, and the battery controller 83 may be communicatively coupled to one another through an on-vehicle network such as a controller area network (CAN) and a local interconnect network (LIN). Moreover, to the main controller 90, coupled may be, without limitation, a vehicle speed sensor 100, an accelerator sensor 101, and a brake sensor 102. The vehicle speed sensor 100 may detect a vehicle speed. The accelerator sensor 101 may detect an operation state of the accelerator pedal. The brake sensor 102 may detect an operation state of a brake pedal. It is to be noted that the main controller 90 may control the starter generator 42 through the ISG controller 74 and control the engine 13 through the engine controller 75.

It is to be noted that the idling stop control unit 97 of the main controller 90 may execute the idling stop control. The idling stop control includes stopping and restarting the engine 13 automatically. The idling stop control unit 97 may execute a fuel cut to stop the engine in a case where a predetermined stop condition is satisfied while the engine 13 is in operation. Meanwhile, the idling stop control unit 97 may cause rotation of the starter generator 42 to restart the engine 13 in a case where a predetermined start condition is satisfied while the engine 13 is stopped. Non-limiting examples of the stop condition of the engine 13 may include that the vehicle speed is lower than a predetermined value, with the brake pedal being stepped down. Non-limiting examples of the start condition may include that stepping down of the brake pedal is released and that the stepping down of the accelerator pedal is started.

[Power Supply Modes]

Figure 3:
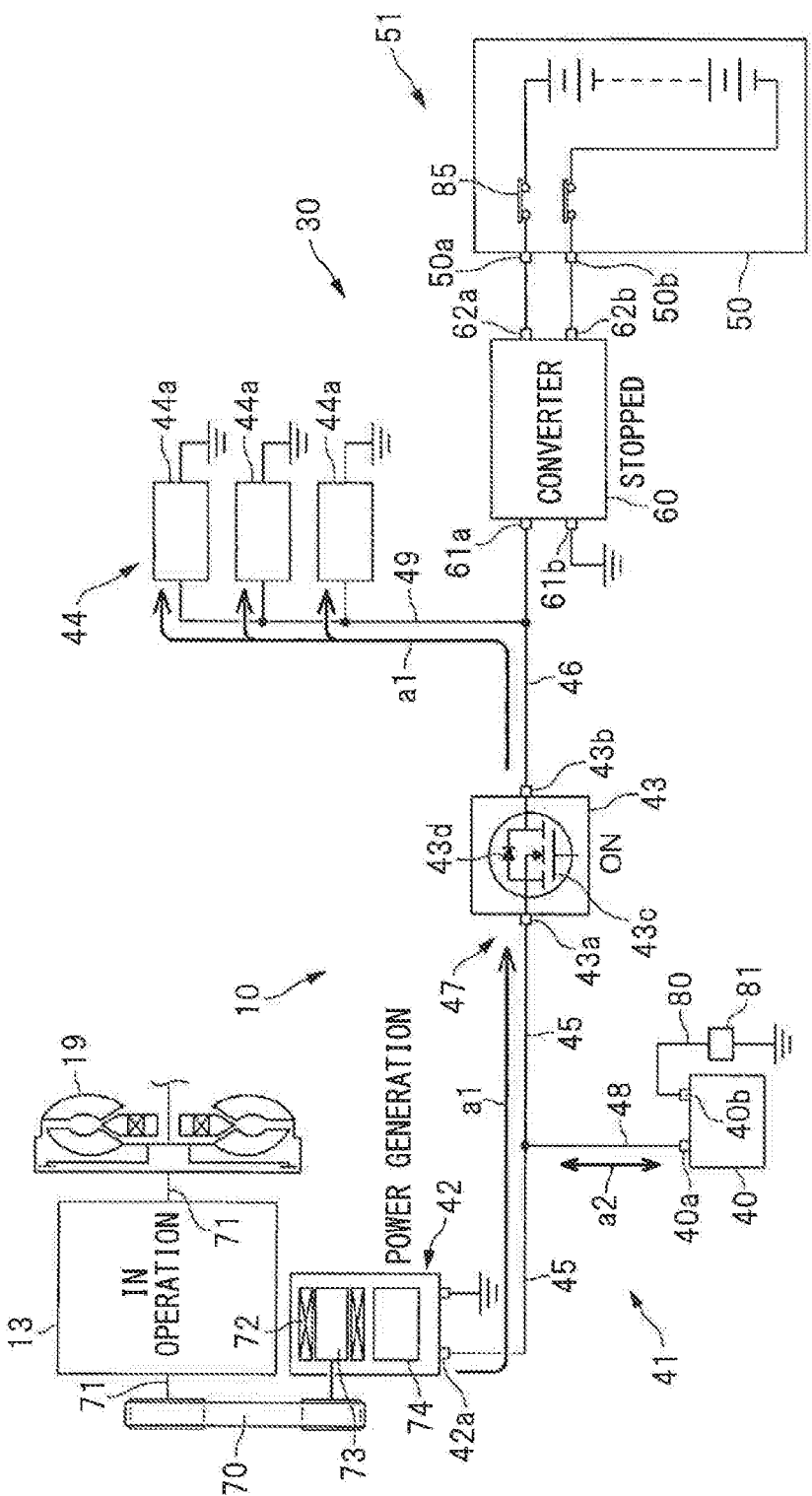
FIG. 3 is a diagram of an example of a situation as to how electric power is supplied in an ISG power generation mode.
Figure 4:
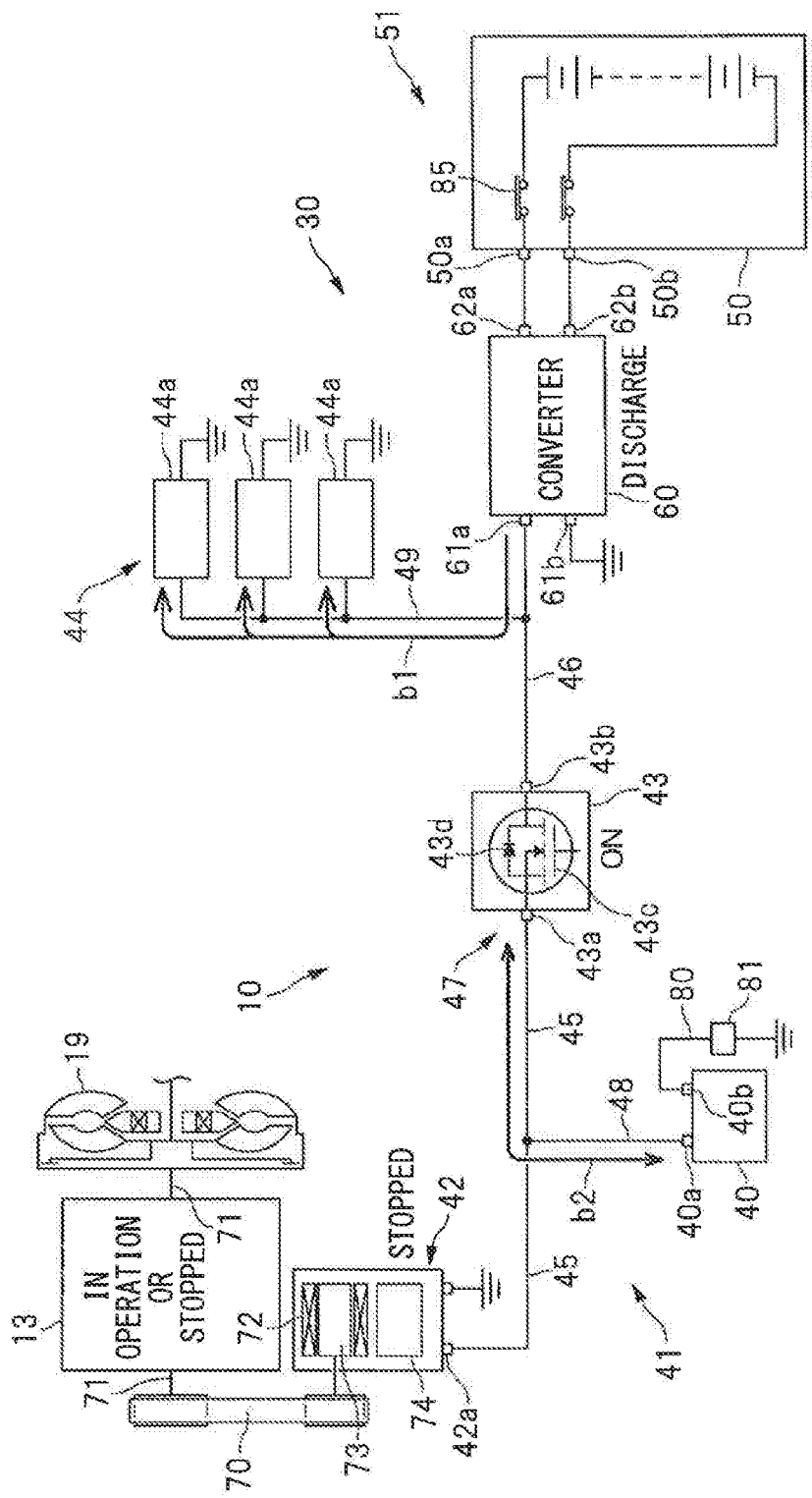
FIG. 4 is a diagram of an example of a situation as to how electric power is supplied in a converter discharge mode.
Figure 5:
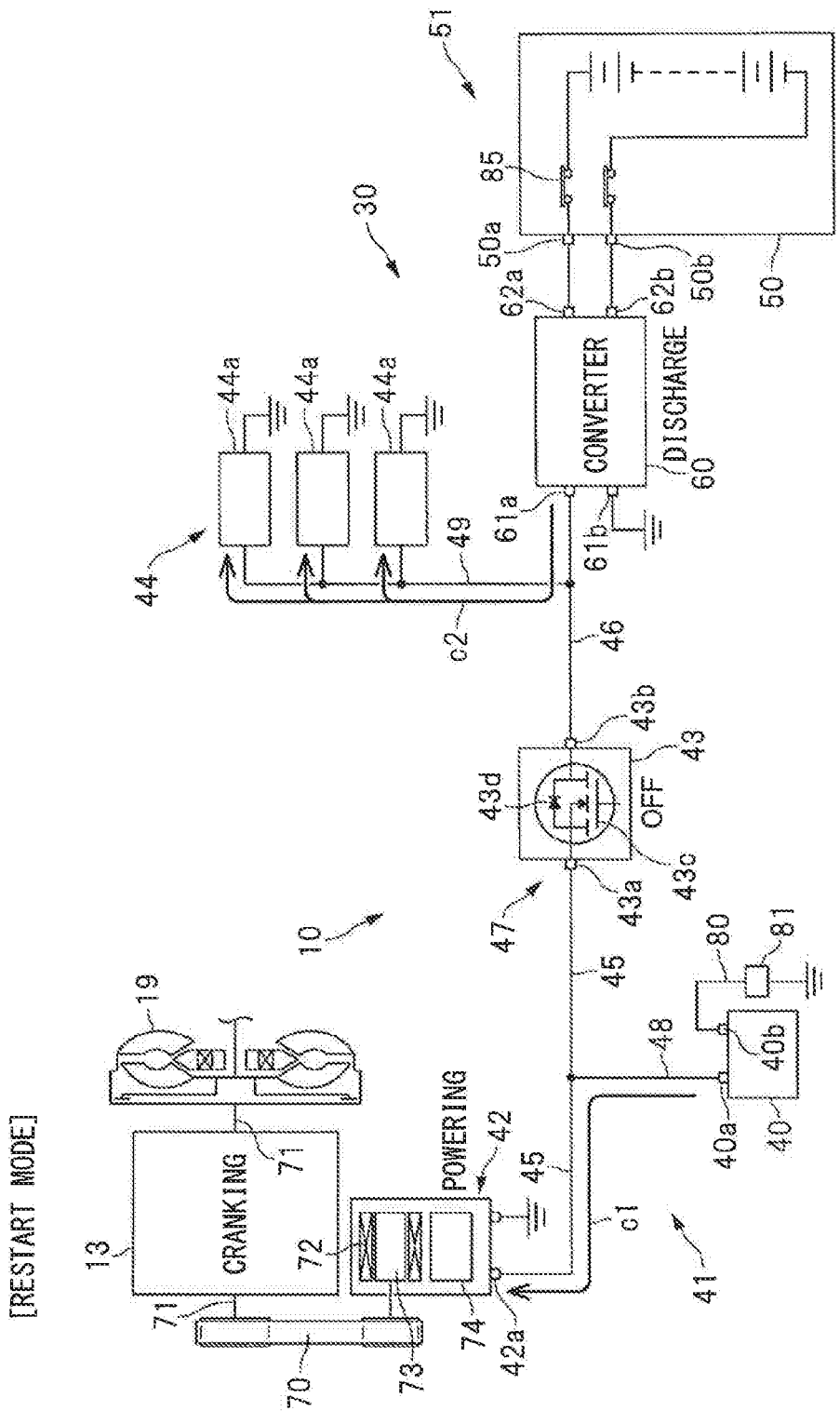
FIG. 5 is a diagram of an example of a situation as to how electric power is supplied in a restart mode.

Described next are control modes of the power circuit 30 by the main controller 90. Hereinbelow the control modes of the power circuit 30 are also referred to as "power supply modes". The power supply modes may include an ISG power generation mode, a converter discharge mode, and a restart mode. The ISG power generation mode includes supplying electric power from the starter generator 42 to, without limitation, the group of the electric devices 44. The converter discharge mode includes supplying electric power from the converter 60 to, without limitation, the group of the electric devices 44. The restart mode is executed at the engine restart. FIG. 3 is a circuit diagram of an example of a situation as to how electric power is supplied in the ISG power generation mode. FIG. 4 is a circuit diagram of an example of a situation as to how electric power is supplied in the converter discharge mode. FIG. 5 is a circuit diagram of an example of a situation as to how electric power is supplied in the restart mode. In FIGS. 3 to 5, the situations as to how electric power is supplied are denoted by arrows.

The converter discharge mode and the ISG power generation mode may be executed on the basis of, for example but not limited to, the SOC of the high-voltage battery 50. For example, during the execution of the converter discharge mode, in a case where the SOC of the high-voltage battery 50 lowers and becomes lower than a predetermined value, the power supply mode may be switched from the converter discharge mode to the ISG power generation mode. Meanwhile, during the execution of the ISG power generation mode, in a case where the SOC of the high-voltage battery 50 increases and becomes higher than a predetermined value, the power supply mode may be switched from the ISG power generation mode to the converter discharge mode. Hence, it is possible to positively stop the engine 13, leading to enhanced fuel consumption performance of the vehicle 11.

As illustrated in FIG. 3, in the ISG power generation mode, the semiconductor relay 43 may be controlled to the ON state. The converter 60 may be controlled to the stopped state. The starter generator 42 may be controlled to the power generation state. Thus, as denoted by an arrow a1, electric power is supplied from the positive electrode terminal 42*a* of the starter generator 42 to the electrical conduction path 47, resulting in electric power supply from the electrical conduction path 47 to the group of the electric devices 44. Moreover, because the low-voltage battery 40 is coupled to the electrical conduction path 47, the low-voltage battery 40 is charged or discharge, as denoted by an arrow a2, in accordance with, for example but not limited to, a power generation state of the starter generator 42 and operation states of the group of the electric devices 44.

In the ISG power generation mode, by the main controller 90, a target voltage Tvi of the starter generator 42 may be set on the basis of power consumption of the group of the electric devices 44. The main controller 90 may make a feedback control of the starter generator 42 on the basis of a difference between the power generation voltage Visg and the target voltage Tvi of the starter generator 42, to allow the power generation voltage Visg to converge on the target voltage Tvi. In other words, the main controller 90 may make a feedback control of the power generation voltage Vsig of the starter generator 42 on the basis of the target voltage Tvi. It is to be noted that in the ISG power generation mode in which the starter generator 42 performs the power generation with the use of the engine power, inhibited is the execution of the motor traveling mode and the idling stop control that involve the engine stop.

In one embodiment of the technology, the power generation voltage Visg of the starter generator 42 may serve as a "terminal voltage of the first power supply device".

As illustrated in FIG. 4, in the converter discharge mode, the semiconductor relay 43 may be controlled to the ON state. The converter 60 may be controlled to the discharge state. The starter generator 42 may be controlled to the stopped state. Thus, as denoted by an arrow b1, electric power is supplied from the positive electrode terminal 61a of the converter 60 to the electrical conduction path 47, resulting in electric power supply from the electrical conduction path 47 to the group of the electric devices 44. Moreover, because the low-voltage battery 40 is coupled to the electrical conduction path 47, the low-voltage battery 40 is charged or discharge, as denoted by an arrow b2, in accordance with, for example but not limited to, a discharge state of the converter 60 and the operation states of the group of the electric devices 44.

In the converter discharge mode, by the main controller 90, a target voltage Tvc of the converter 60 may be set on the basis of the power consumption of the group of the electric devices 44. The main controller 90 may make a feedback control of the converter 60 on the basis of a difference between the discharge voltage Vcon and the target voltage Tvc of the converter 60, to allow the discharge voltage Vcon to converge on the target voltage Tvc. In other words, the main controller 90 may make a feedback control of the discharge voltage Vcon of the converter 60 on the basis of the target voltage Tvc. It is to be noted that the execution of the motor traveling mode and the idling stop control are permitted in the converter discharge mode.

In one embodiment of the technology, the discharge voltage Vcon of the converter 60 may serve as a "terminal voltage of the second power supply device".

In a case where a request for the engine restart is made, the power supply mode may be switched to the restart mode. Non-limiting examples of such a case may include a case where a decision is made to switch from the motor traveling mode to the engine traveling mode, and a case where the predetermined start condition is satisfied during the engine stop by the idling stop control. As illustrated in FIG. 5, in the restart mode, the semiconductor relay 43 may be controlled to the OFF state. The converter 60 may be controlled to the discharge state. The starter generator 42 may be controlled to the powering state. Thus, as denoted by an arrow c1, electric power is supplied from the low-voltage battery 40 to the starter generator 42. Moreover, as denoted by an arrow c2, electric power is supplied from the converter 60 to the group of the electric devices 44.

In the restart mode in which power consumption of the starter generator 42 increases rapidly, the semiconductor relay 43 may be controlled to the OFF state. This renders cut off the current flowing from the converter 60 toward the starter generator 42. Hence, it is possible to prevent an instantaneous voltage drop with respect to the group of the electric devices 44, and to allow the group of the electric devices 44 to operate normally, even in a case with large current supply from the low-voltage battery 40 to the starter generator 42. It is to be noted that after the engine restart by the restart mode, the converter discharge mode or the ISG power generation mode may be executed on the basis of the SOC of the high-voltage battery 50.

[From ISG Power Generation Mode to Converter Discharge Mode]

Description now moves on to a switching control from the ISG power generation mode to the converter discharge mode by the main controller 90. As mentioned above, during the execution of the ISG power generation mode, in the case where the SOC of the high-voltage battery 50 increases and becomes higher than the predetermined value, the power supply mode may be switched from the ISG power generation mode to the converter discharge mode. Moreover, in the ISG power generation mode, the feedback control of the starter generator 42 may be made, to allow the power generation voltage Visg to converge on the target voltage Tvi. Furthermore, in the converter discharge mode, the feedback control of the converter 60 may be made, to allow the discharge voltage Vcon to converge on the target voltage Tvc. Here, simultaneous execution of the ISG power generation mode and the converter discharge mode causes both the feedback control of the starter generator 42 and the feedback control of the converter 60 to be made simultaneously. This may cause the feedback control of the starter generator 42 and the feedback control of the converter 60 to interfere with each other, resulting in possibility of fluctuation in the power generation voltage Visg and the discharge voltage Vcon.

Thus, the main controller 90 executes the converter discharge mode after stopping the ISG power generation mode, in terms of avoidance of the simultaneous execution of the ISG power generation mode and the converter discharge mode. However, there may be a case where in the course of a switching procedure of the power supply modes, both the ISG power generation mode and the converter discharge mode are stopped, with the low-voltage battery 40 having abnormality such as the lowered SOC or coming off of a terminal. In such a case, there may be shortage of electric power to be supplied from the low-voltage battery 40 to the group of the electric devices 44. This causes difficulty in switching the power supply modes while allowing the group of the electric devices 44 to operate normally. Accordingly, the main controller 90 switches the power supply modes while determining the discharge state of the low-voltage battery 40, in order to avoid the shortage of electric power to be supplied from the low-voltage battery 40 to the group of the electric devices 44.

[Timing Chart]

Figure 6:
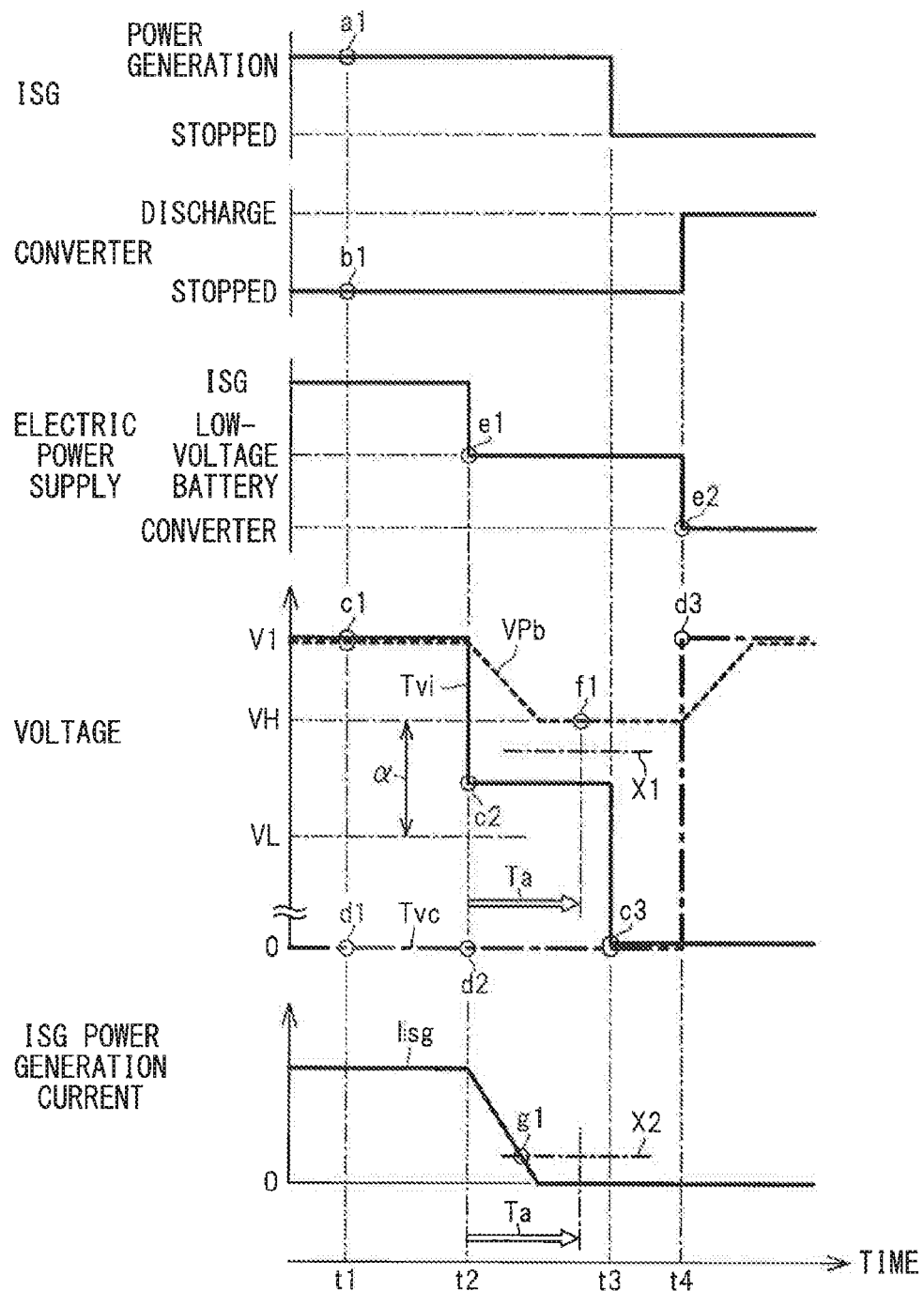
FIG. 6 is a timing chart of operation states of a starter generator and other parts in a switching control.
Figure 7:
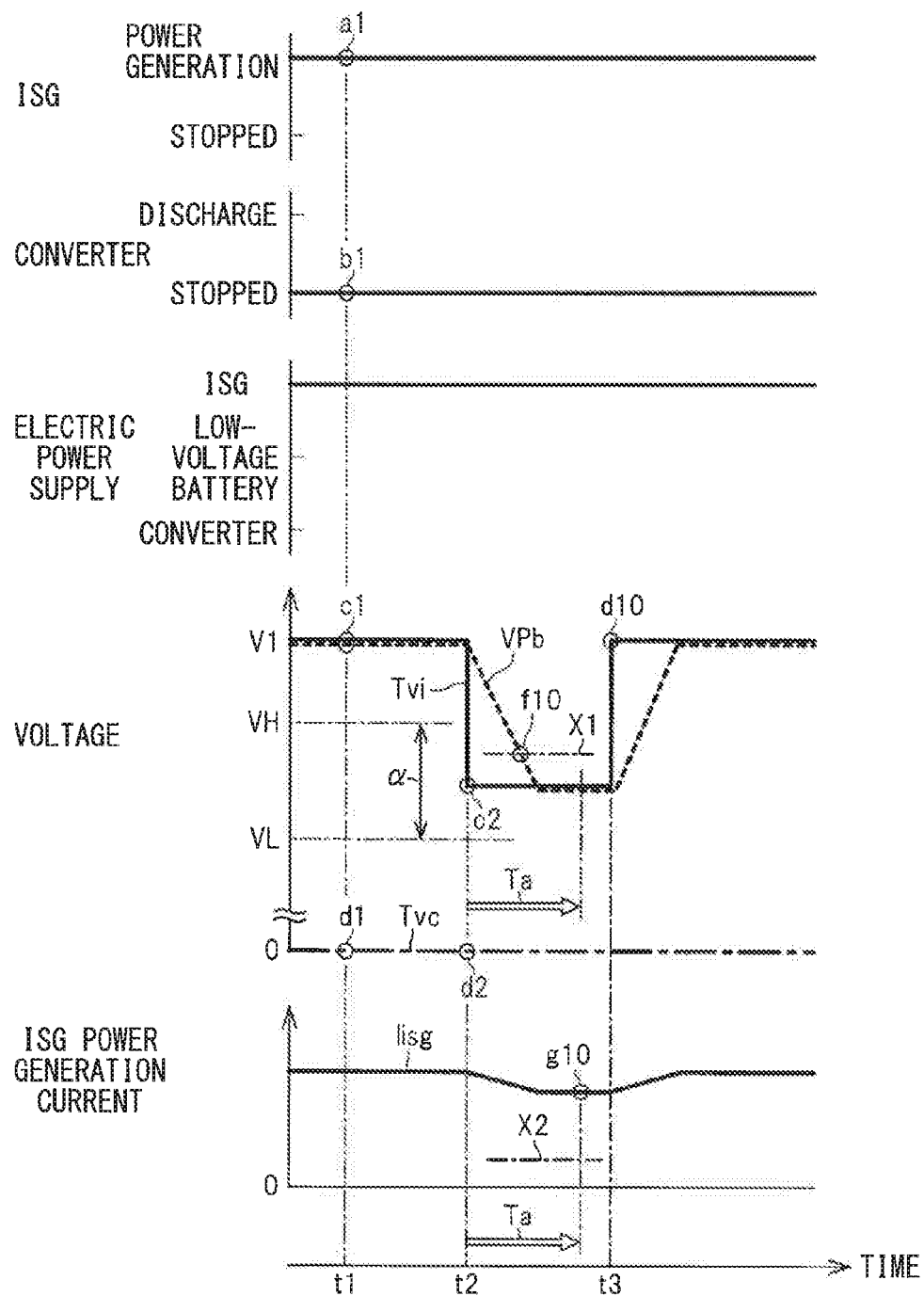
FIG. 7 is a timing chart of the operation states of the starter generator and other parts in the switching control.

Described below is the switching control from the ISG power generation mode to the converter discharge mode, with reference to timing charts. FIGS. 6 and 7 are timing charts of operation states of the starter generator 42 and other parts in the switching control. FIG. 6 illustrates the operation states, with the discharge state of the low-voltage battery 40 being normal. FIG. 7 illustrates the operation states, with the discharge state of the low-voltage battery 40 being abnormal. It is to be noted that in FIG. 7, the same states as those in FIG. 6 are denoted by the same reference characters, and description thereof is omitted. In FIGS. 6 and 7, the target voltage Tvi of the starter generator 42, the target voltage Tvc of the converter 60, and the battery voltage VPb are slightly displaced even if they should be superposed on one another, in order to clarify voltage transitions. In FIGS. 6 and 7, the starter generator 42 is abbreviated to "ISG".

In FIG. 6, at time t1, in the ISG power generation mode, the starter generator 42 may be controlled to the power generation state (reference characters a1). The converter 60 may be controlled to the stopped state (reference characters b1). At this occasion, the target voltage Tvi of the starter generator 42 may be controlled to a predetermined voltage V1 (reference characters c1), and the target voltage Tvc of the converter 60 may be controlled to zero (0) V (reference characters d1). In this way, in the ISG power generation mode that includes allowing the starter generator 42 to perform the power generation, the target voltage Tvi of the starter generator 42 is allowed to be higher than a superior voltage VH, and the target voltage Tvc of the converter 60 is allowed to be lower than an inferior voltage VL. Here, the inferior voltage VL may be a lower limit voltage that allows the electric devices 44a to operate normally. The superior voltage VH is higher than the inferior voltage VL. The superior voltage VH may be an open circuit voltage of the low-voltage battery 40 in full charge.

Thereafter, a decision may be made to switch from the ISG power generation mode to the converter discharge mode. Thus, at time t2, the target voltage Tvi of the starter generator 42 may be reduced to within a voltage range a between the superior voltage VH and the inferior voltage VL, to allow the target voltage Tvi of the starter generator 42 to be lower than the superior voltage VH and to be higher than the inferior voltage VL (reference characters c2). In other words, the decision is made to switch to the converter discharge mode, and thereupon, the target voltage Tvi of the starter generator 42 is controlled to be between the superior voltage VH and the inferior voltage VL (reference characters c2). This makes the target voltage Tvi of the starter generator 42 lower than the battery voltage VPb, causing electric power to be supplied from the low-voltage battery 40 to the group of the electric devices 44. In other words, assignment of electric power supply to the group of the electric devices 44 is transferred from the starter generator 42 to the low-voltage battery 40 (reference characters e1).

Thus, the target voltage TVi of the starter generator 42 is reduced to within the voltage range a (reference characters c2), and thereupon, a determination may be made as to whether or not the battery voltage VPb is higher than a threshold X1. In determining whether or not the battery voltage VPb is higher than the threshold X1, the target voltage Tvc of the converter 60 may be controlled to zero (0) V (reference characters d2). In other words, in determining whether or not the battery voltage VPb is higher than the threshold X1, the target voltage Tvc of the converter 60 is controlled to be lower than the inferior voltage VL (reference characters d2). The threshold X1 is provided for comparison with the battery voltage VPb. The threshold X1 may be set at a value that is higher than the target voltage Tvi of the starter generator 42 and is lower than the superior voltage VH.

As illustrated in FIG. 6, a situation that the target voltage Tvi of the starter generator 42 is reduced to within the voltage range a (reference characters c2), and thereafter, the battery voltage VPb is higher than the threshold X1 for determination time Ta (reference characters f1) is equivalent to a situation that the battery voltage VPb does not follow the reduced target voltage Tvi of the starter generator 42, i.e., a situation that the low-voltage battery 40 is devoid of, for example, the lowered SOC or a lowered output. Accordingly, in the case where the battery voltage VPb is higher than the threshold X1 for the determination time Ta (reference characters f1), a determination may be made that the discharge state of the low-voltage battery 40 is normal.

Thus, the determination is made that the discharge state of the low-voltage battery 40 is normal, and thereupon, at time t3, the target voltage Tvi of the starter generator 42 is reduced to zero (0) V (reference characters c3). At time t4, the target voltage Tvc of the converter 60 is raised to the predetermined voltage V1 (reference characters d3). This makes the target voltage Tvc of the converter 60 higher than the battery voltage VPb. Accordingly, the assignment of the electric power supply to the group of the electric devices 44 is transferred from the low-voltage battery 40 to the converter 60 (reference characters e2). In other words, after confirming that the discharge state of the low-voltage battery 40 is normal, the power supply mode is switched from the ISG power generation mode to the converter discharge mode. It is to be noted that in the converter discharge mode that includes allowing the converter 60 to discharge, the target voltage Tvc of the converter 60 is allowed to be higher than the superior voltage VH, and the target voltage Tvi of the starter generator 42 is allowed to be lower than the inferior voltage VL.

In FIG. 7, illustrated is a situation that the target voltage Tvi of the starter generator 42 is reduced to within the voltage range a (reference characters c2), and thereafter, the battery voltage VPb becomes lower than the threshold X1 within the determination time Ta (reference characters f10). This situation is equivalent to a situation that the battery voltage VPb follows the reduced target voltage Tvi of the starter generator 42, i.e., a situation that the low-voltage battery 40 has, for example, the lowered SOC or the lowered output. Accordingly, in the case where the battery voltage VPb becomes lower than the threshold X1 within the determination time Ta (reference characters f10), a determination may be made that the discharge state of the low-voltage battery 40 is abnormal.

Thus, the determination is made that the discharge state of the low-voltage battery 40 is abnormal, and thereupon, at time t3, the target voltage Tvi of the starter generator 42 is raised again to the predetermined voltage V1 (reference characters d10). In this way, the ISG power generation mode is continued as the power supply mode, resulting in continuous electric power supply from the starter generator 42 to the group of the electric devices 44. Moreover, in determining the discharge state of the low-voltage battery 40 for the determination time Ta, the target voltage Tvi of the starter generator 42 may be kept higher than the inferior voltage VL. Hence, it is possible to maintain electric power supply from the starter generator 42 to the group of the electric devices 44, and to allow the group of the electric devices 44 to operate normally, even in a case with abnormality in the discharge state of the low-voltage battery 40.

As described above, in the case where the power supply mode is switched from the ISG power generation mode to the converter discharge mode, the determination is made as to whether or not the discharge state of the low-voltage battery 40 is normal, with the target voltage Tvc of the converter 60 controlled to be lower than the inferior voltage VL (reference characters d2), and with the target voltage Tvi of the starter generator 42 controlled to be between the superior voltage VH and the inferior voltage VL (reference characters c2). After the determination is made that the discharge state of the low-voltage battery 40 is normal, the target voltage Tvi of the starter generator 42 is allowed to be lower than the inferior voltage VL (reference characters c3), and the target voltage Tvc of the converter 60 is allowed to be higher than the superior voltage VH (reference characters d3).

As described, in switching the power supply mode from the ISG power generation mode to the converter discharge mode, the determination is made as to whether or not the discharge state of the low-voltage battery 40 is normal. Hence, it is possible to switch the power supply mode from the ISG power generation mode to the converter discharge mode, without interrupting electric power supply to the electric devices 44a in the course of the switching of the power supply mode. In other words, it is possible to continue electric power supply from the low-voltage battery 40 to the electric devices 44a even in the case where the starter generator 42 and the converter 60 are both stopped in order to avoid the voltage fluctuation caused by the feedback controls interfering with each other in the course of the switching of the power supply modes.

In the forgoing description, the target voltage Tvi of the starter generator 42 is controlled to within the voltage range a, and thereafter, the determination is made as to whether or not the discharge state of the low-voltage battery 40 is normal, on the basis of the determination as to whether or not the battery VPb is higher than the threshold X1. However, this is non-limiting. The discharge state of the low-voltage battery 40 may be determined with the use of other values than the battery voltage VPb and the threshold X1. For example, in a case where the applied voltage to the electrical conduction path 47 is detectable with the use of, for example, a voltage sensor, the discharge state of the low-voltage battery 40 may be determined with the use of the applied voltage to the electrical conduction path 47 instead of the battery voltage VPb. Moreover, in the forgoing description, the threshold X1 is used that is set at a higher value than the target voltage Tvi of the starter generator 42. However, the discharge state of the low-voltage battery 40 may be determined with the use of the target voltage Tvi instead of the threshold X1. In other words, in determining whether or not the discharge state of the low-voltage battery 40 is normal, it suffices to determine whether or not the applied voltage to the electrical conduction path 47 is higher than the target voltage Tvi of the starter generator 42. Accordingly, the discharge state of the low-voltage battery 40 may be determined with the use of other values than the battery voltage VPb and the threshold X1. In this case, the determination may be made that the discharge state of the low-voltage battery 40 is normal in a case where the applied voltage to the electrical conduction path 47 is higher than the target voltage Tvi of the starter generator 42 for the determination time Ta after the target voltage Tvi of the starter generator 42 is controlled to within the voltage range a.

Moreover, in the forgoing description, the target voltage Tvi of the starter generator 42 is reduced to within the voltage range a, and thereafter, the determination is made as to whether or not the discharge state of the low-voltage battery 40 is normal, on the basis of the transitions of the battery voltage VPb, or the applied voltage to the electrical conduction path 47. However, this is non-limiting. As illustrated in FIGS. 6 and 7, the target voltage Tvi of the starter generator 42 is reduced to within the voltage range a (reference characters c2), and thereafter, a determination may be made as to whether the power generation current Iisg becomes lower than a predetermined threshold X2 within the determination time Ta. As denoted by reference characters g1 in FIG. 6, a situation that the power generation current Iisg of the starter generator 42 becomes lower than the threshold X2 is equivalent to a situation that the assignment of the electric power supply is transferred from the starter generator 42 to the low-voltage battery 40. Accordingly, in this situation, a determination may be made that the discharge state of the low-voltage battery 40 is normal. In contrast, as denoted by reference characters g10 in FIG. 7, a situation that the power generation current Iisg of the starter generator 42 is higher than the threshold X2 for the determination time Ta is equivalent to a situation that the assignment of the electric power supply has not been transferred from the starter generator 42 to the low-voltage battery 40. Accordingly, in this situation, a determination may be made that the discharge state of the low-voltage battery 40 is abnormal. It is to be noted that the threshold X2 may be set at a predetermined value near zero (0) A, or alternatively, the threshold X2 may be set at zero (0) A.

In one embodiment of the technology, the power generation current Iisg may serve as a "discharge current".

[Flowchart]

Figure 8:
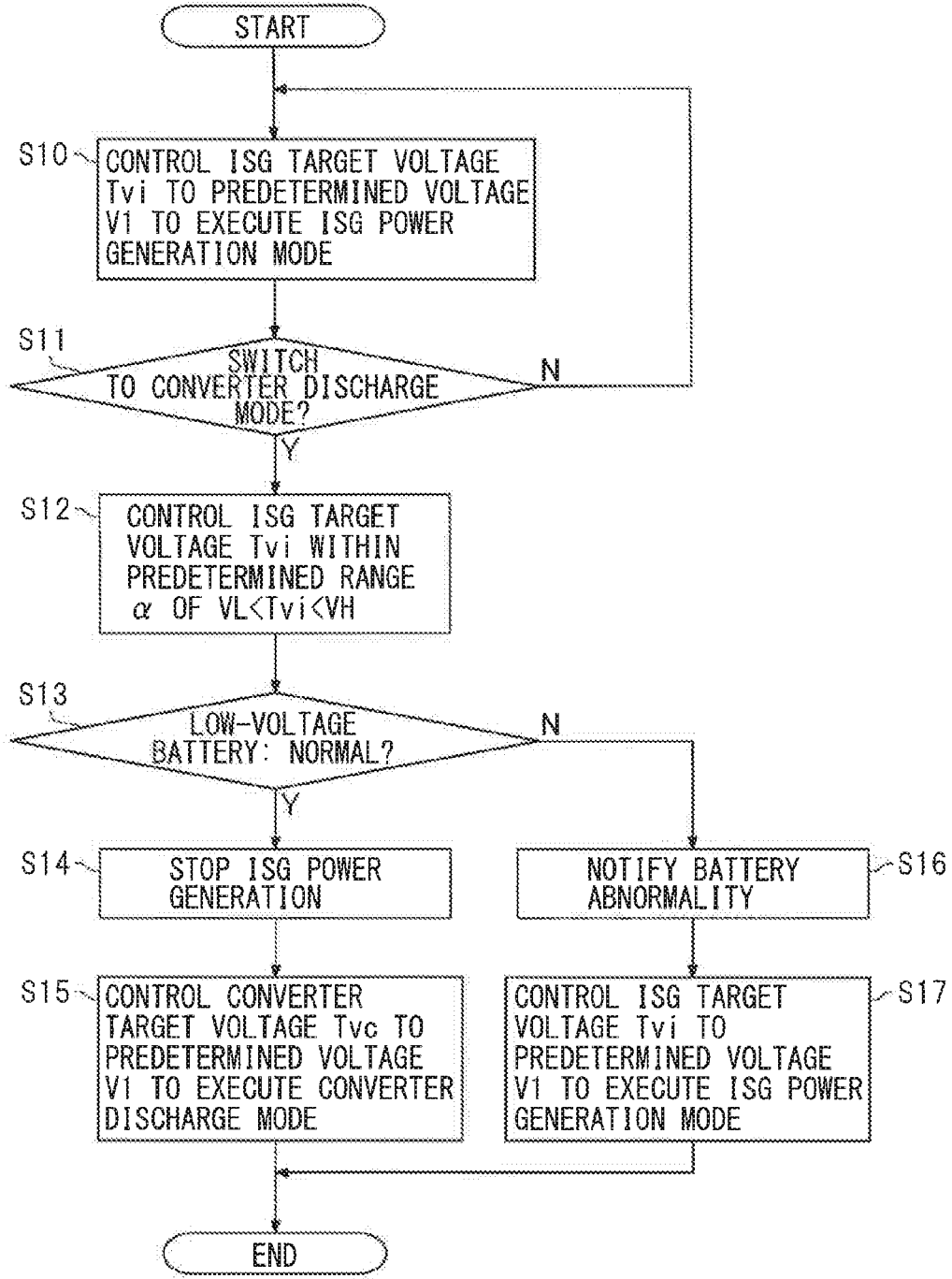
FIG. 8 is a flowchart of an example of a switching procedure from the ISG power generation mode to the converter discharge mode.

Described below is the switching control from the ISG power generation mode to the converter discharge mode as described above, with reference to a flowchart. FIG. 8 is a flowchart of an example of a switching procedure from the ISG power generation mode to the converter discharge mode. It is to be noted that in FIG. 8, the starter generator 42 is abbreviated to "ISG".

Referring to FIG. 8, in step S10, the ISG power generation mode may be executed as the power supply mode, and the target voltage Tvi of the starter generator 42 may be controlled to the predetermined voltage V1. Thereafter, in step S11, a determination may be made as to whether or not to switch the power supply mode to the converter discharge mode, on the basis of, for example, the SOC of the high-voltage battery 50. In step S11, in a case with a determination not to switch the power supply mode to the converter discharge mode (N in step S11), the flow may be returned to step S10. In step S11, in a case with a determination to switch the power supply mode to the converter discharge mode (Y in step S11), the flow may proceed to step S12. In step S12, the target voltage Tvi of the starter generator 42 may be controlled to within the voltage range a. Thereafter, in step S13, the determination may be made as to whether or not the discharge state of the low-voltage battery 40 is normal, on the basis of, for example, the battery voltage VPb or the power generation current Iisg.

In step S13, in the case with the determination that the discharge state of the low-voltage battery 40 is normal (Y in step S13), the flow may proceed to step S14. In step S14, the target voltage Tvi of the starter generator 42 may be reduced, and the starter generator 42 may be controlled to the stopped state. Thereafter, in step S15, the target voltage Tvc of the converter 60 may be controlled to the predetermined voltage V1, to switch the power supply mode to the converter discharge mode. Meanwhile, in step S13, in the case with the determination that the discharge state of the low-voltage battery 40 is abnormal (N in step S13), the flow may proceed to step S16. In step S16, a notification of the abnormality in the low-voltage battery 40 may be given to an occupant. Thereafter, in step S17, the target voltage Tvi of the starter generator 42 may be controlled again to the predetermined voltage V1, and the IS G power generation mode may be continued as the power supply mode.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. In the forgoing description, the starter generator 42 may serve as the "first power supply device" and the converter 60 may serve as the "second power supply device", but this is non-limiting. For example, the converter 60 may serve as the "first power supply device" and the starter generator 42 may serve as the "second power supply device". In other words, in switching the power supply mode from the converter discharge mode to the ISG power generation mode, the determination may be made as to whether or not the discharge state of the low-voltage battery 40 is normal, on the basis of, for example, the battery voltage VPb, or the applied voltage to the electrical conduction path 47, with the target voltage Tvc of the converter 60 controlled to within the voltage range a.

Moreover, in the forgoing description, the starter generator 42 that serves as a motor generator may serve as the "first power supply device", but this is non-limiting. An alternator that serves as a generator may serve as the "first power supply device". Furthermore, in the forgoing description, the superior voltage VH that defines the voltage range may be the open circuit voltage of the low-voltage battery 40 in full charge, but the superior voltage VH is not limited to the open circuit voltage in full charge. It suffices for the superior voltage VH to be an open circuit voltage indicating that the low-voltage battery 40 functions normally. For example, the superior voltage VH may be an open circuit voltage, with the SOC being other than 100%, e.g., with the SOC being 80% or 70%/

In the example embodiments as illustrated, the low-voltage system 41 includes a switch such as the semiconductor relay 43, but this is non-limiting. The switch such as the semiconductor relay 43 may be eliminated from the low-voltage system 41 insofar as the voltage drop with respect to the group of the electric devices 44 at the engine restart is avoidable. Moreover, in the example embodiments as illustrated, the switch includes the semiconductor relay 43 including the opening and closing part 43c and the diode part 43d. However, this is non-limiting. The switch may include, for example, a relay that mechanically opens and closes a contact.

The low-voltage battery 40 may include, for example, a lead battery having an open circuit voltage of about 12 V and the high-voltage battery 50 may include, for example, a lithium ion battery having an open circuit voltage of about 118 V. However, the low-voltage battery 40 and the high-voltage battery 50 may include batteries or capacitors of other forms, or include batteries or capacitors having other open circuit voltages. Moreover, a power train to be mounted on the vehicle 11 is not limited to the power train 12 given as an example in FIG. 1, but may include power trains of other forms.

As described, in switching from a state with electric power supplied from a first power supply device to an electric device, to a state with electric power supplied from a second power supply device to the electric device, a power supply controller is configured to make a determination as to whether or not a discharge state of an accumulator is normal. The determination is made, with a target voltage of the second power supply device controlled to be lower than an inferior voltage, and with a target voltage of the first power supply device controlled to be between the inferior voltage and a superior voltage. The superior voltage is higher than the inferior voltage. After determining that the discharge state of the accumulator is normal, the power supply controller is configured to allow the target voltage of the first power supply device to be lower than the inferior voltage, and to allow the target voltage of the second power supply device to be higher than the superior voltage. Hence, it is possible to transfer assignment of electric power supply from the first power supply device to the second power supply device, without causing shortage of electric power to be supplied to the electric device.

The main controller 90, the ISG control unit 92, the converter control unit 94, and the battery determination unit 98 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 90, the ISG control unit 92, the converter control unit 94, and the battery determination unit 98. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 90, the ISG control unit 92, the converter control unit 94, and the battery determination unit 98 illustrated in FIG. 2.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle power supply apparatus to be mounted on a vehicle, the vehicle power supply apparatus comprising:
   a first power supply device including a first terminal;
   a second power supply device including a second terminal;
   an electrical conduction path coupled between the first terminal and the second terminal;
   an accumulator coupled to the electrical conduction path;
   an electric device coupled to the electrical conduction path; and
   a power supply controller configured to control a target voltage of the first power supply device and a target voltage of the second power supply device, to supply electric power from the first power supply device or the second power supply device to the electric device, wherein
   in switching from a state with electric power supplied from the first power supply device to the electric device, to a state with electric power supplied from the second power supply device to the electric device, the power supply controller determines whether a discharge state of the accumulator is normal, with the target voltage of the second power supply device controlled to be lower than an inferior voltage, and with the target voltage of the first power supply device controlled to be between the inferior voltage and a superior voltage, the superior voltage being higher than the inferior voltage, and after determining that the discharge state of the accumulator is normal, allows the target voltage of the first power supply device to be lower than the inferior voltage, and allows the target voltage of the second power supply device to be higher than the superior voltage.

2. The vehicle power supply apparatus according to claim 1, wherein the power supply controller allows the target voltage of the first power supply device to be higher than the superior voltage and allows the target voltage of the second power supply device to be lower than the inferior voltage, in the state with electric power supplied from the first power supply device to the electric device, and allows the target voltage of the first power supply device to be lower than the inferior voltage and allows the target voltage of the second power supply device to be higher than the superior voltage, in the state with electric power supplied from the second power supply device to the electric device.

3. The vehicle power supply apparatus according to claim 1, wherein the superior voltage comprises an open circuit voltage of the accumulator.

4. The vehicle power supply apparatus according to claim 2, wherein the superior voltage comprises an open circuit voltage of the accumulator.

5. The vehicle power supply apparatus according to claim 1, wherein the inferior voltage comprises a lower limit voltage that allows the electric device to operate.

6. The vehicle power supply apparatus according to claim 2, wherein the inferior voltage comprises a lower limit voltage that allows the electric device to operate.

7. The vehicle power supply apparatus according to claim 1, wherein the power supply controller determines that the discharge state of the accumulator is normal on a condition that an applied voltage to the electrical conduction path is higher than the target voltage of the first power supply device, with the target voltage of the second power supply device controlled to be lower than the inferior voltage, and with the target voltage of the first power supply device controlled to be between the inferior voltage and the superior voltage.

8. The vehicle power supply apparatus according to claim 2, wherein the power supply controller determines that the discharge state of the accumulator is normal on a condition that an applied voltage to the electrical conduction path is higher than the target voltage of the first power supply device, with the target voltage of the second power supply device controlled to be lower than the inferior voltage, and with the target voltage of the first power supply device controlled to be between the inferior voltage and the superior voltage.

9. The vehicle power supply apparatus according to claim 1, wherein the power supply controller determines that the discharge state of the accumulator is normal on a condition that a discharge current from the first terminal is lower than a threshold, with the target voltage of the second power supply device controlled to be lower than the inferior voltage, and with the target voltage of the first power supply device controlled to be between the inferior voltage and the superior voltage.

10. The vehicle power supply apparatus according to claim 2, wherein the power supply controller determines that the discharge state of the accumulator is normal on a condition that a discharge current from the first terminal is lower than a threshold, with the target voltage of the second power supply device controlled to be lower than the inferior voltage, and with the target voltage of the first power supply device controlled to be between the inferior voltage and the superior voltage.

11. The vehicle power supply apparatus according to claim 1, further comprising an additional accumulator having a higher voltage than the accumulator, wherein the first power supply device comprises a generator coupled to an engine of the vehicle, and the second power supply device comprises a converter configured to step down electric power from the additional accumulator and to output stepped-down electric power.

12. The vehicle power supply apparatus according to claim 2, further comprising an additional accumulator having a higher voltage than the accumulator, wherein the first power supply device comprises a generator coupled to an engine of the vehicle, and the second power supply device comprises a converter configured to step down electric power from the additional accumulator and to output stepped-down electric power.

13. The vehicle power supply apparatus according to claim 1, wherein the power supply controller makes a feedback control of a terminal voltage of the first power supply device on a basis of the target voltage of the first power supply device, and makes a feedback control of a terminal voltage of the second power supply device on a basis of the target voltage of the second power supply device.

14. The vehicle power supply apparatus according to claim 2, wherein the power supply controller makes a feedback control of a terminal voltage of the first power supply device on a basis of the target voltage of the first power supply device, and makes a feedback control of a terminal voltage of the second power supply device on a basis of the target voltage of the second power supply device.

* * * * *